United States Patent [19]

Kobayashi et al.

[11] Patent Number: 5,106,933
[45] Date of Patent: Apr. 21, 1992

[54] ADHESIVE SILICONE COMPOSITIONS

[75] Inventors: Takaomi Kobayashi; Yasuji Matsumoto, both of Ohta, Japan

[73] Assignee: Toshiba Silicone Co., Ltd., Japan

[21] Appl. No.: 535,448

[22] Filed: Jun. 8, 1990

[30] Foreign Application Priority Data

Jul. 3, 1989 [JP] Japan .................. 1-171370

[51] Int. Cl.$^5$ .............................. C08G 77/06
[52] U.S. Cl. ............................ 528/15; 528/27; 524/262; 524/265; 524/719; 524/730; 524/731
[58] Field of Search ............... 528/15, 27; 524/730, 524/731, 719, 720, 262, 265

[56] References Cited

U.S. PATENT DOCUMENTS

| | | | |
|---|---|---|---|
| 4,609,574 | 9/1986 | Keryk et al. | 525/15 |
| 4,849,564 | 7/1989 | Shimizu et al. | 528/15 |
| 5,051,467 | 9/1991 | Okinoshima et al. | 528/15 |

Primary Examiner—Melvyn I. Marquis

[57] ABSTRACT

An addition reaction-type adhesive silicone composition comprising (A) an alkenyl group-containing polyorganosiloxane; (B) a polyorganohydrogensiloxane; (C) at least two members selected from the group consisting of (1) (meth)acryloxy group-containing alkoxysilanes or siloxanes, (2) epoxy ring-containing alkoxysilanes or siloxanes and (3) isocyanurate compounds; and (D) Pt, Pd, or Rh compounds. The composition exhibits excellent adhesiveness for plastic materials, and its cured products have excellent heat-resistant and moisture-resistant properties.

6 Claims, No Drawings

5,106,933

ADHESIVE SILICONE COMPOSITIONS

The present application claims the priority of Japanese Patent Application Serial No. 1-171370 filed on Jul. 3, 1989.

FIELD OF THE INVENTION

The present invention relates to addition reaction-type adhesive silicone compositions. More particularly, it relates to heat and moisture resistant silicone compositions having excellent adhesion to plastic materials, such as polybutylene terephthalates, phenol resins and epoxy resins.

BACKGROUND OF THE INVENTION

Silicone compositions curable by the reaction of a hydrosilyl group and an alkenyl group bonded to a silicon atom are known in the art.

However, cured products of such silicone compositions have no adhesion properties. Thus, for example, when such silicone compositions are injected into electric and electronic parts and cured therein, moisture easily penetrates through the gap formed between the parts and the cured silicone compositions, thus causing corrosion and deterioration in the insulation. It has therefore been attempted to solve the problems by incorporating adhesion-promoters into such compositions.

Compounds known in the art for providing adhesion properties to silicone rubber compositions include, for example, alkenyl group-containing alkoxysilanes (Japanese Patent Publication No. 36,255/72 and 34,362/79); epoxy compounds in combination with carboxylic anhydrides (Japanese Patent Application (Laid Open) No. 37,157/79); epoxy group-containing alkoxysilanes in combination with vinyl and hydroxyl group-containing siloxanes (Japanese Patent Application (Laid Open) No. 144,960/78); alkoxysilanes or siloxanes containing both epoxy groups and alkenyl groups (Japanese Patent Application (Laid Open) Nos. 24,258/77 and 147,657); hydrogensiloxanes containing oxirane groups bonded to the silicon atom (Japanese Patent Application (Laid Open) No. 240,360/87); acryloxyalkylalkoxysilanes used in combination with organic peroxides (Japanese Patent Application (Laid Open) No. 26,855/75); alkylenepropenoxysilanes or alkylenepropenoxysiloxanes (Japanese Patent Application (Laid Open) No. 3,460/75); and isocyanuric acids substituted with silanes or siloxanes (Japanese Patent Application (Laid Open) No. 137,355/82). It is disclosed in Japanese Patent Application (Laid Open) No. 94,068/75 that the ethylenically unsaturated group-containing isocyanurates, which have been used as an addition reaction inhibitor, also provide adhesion properties. However, with the recent development and rapid propagation of new substrate materials, particularly synthetic plastic materials, it is becoming increasingly difficult to improve the adhesion properties of silicone compositions using the adhesion-promoting compounds recited above. This is because substrate materials which have hitherto been made of easily-adhered to metal, such as aluminum, copper, nickel, etc. have been replaced in many applications by substrates made of hard-to-adhere to synthetic plastic materials. It has therefore been desired to develop silicone compositions which exhibit adhesion to a broad variety of synthetic plastic materials.

In Japanese Patent Application (Laid Open No. 48,853/79, it is disclosed that the compound having the following formula:

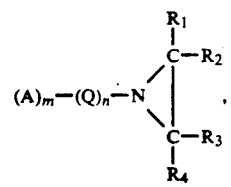

is capable of imparting adhesion to silicone compositions. However, although silicone compositions incorporated with this compound exhibit good adhesion properties, the heat-resistant and moisture-resistant adhesive properties of cured products thereof are still insufficient.

SUMMARY OF THE INVENTION

It is, therefore, an object of the present invention to provide silicone compositions having excellent adhesion to plastic materials.

It is another object of the present invention to provide adhesive silicone compositions which are capable of maintaining the initial properties, e.g., rubber elasticity, even under high temperature and high humidity conditions.

It is a further object of the present invention to provide silicone compositions which exhibit excellent adhesive heat-resistant and moisture-resistant properties when applied to such plastic materials as those described above.

It has now been found that adhesive compositions which not only have excellent adhesion to plastics but which are capable of maintaining excellent adhesion even under high temperature and high humidity conditions can be obtained by using, as adhesion-imparting agents, at least two compounds selected from reactive (meth)acryloxy-containing alkoxysilanes, epoxy-containing alkoxysilanes and isocyanurates.

DETAILED DESCRIPTION OF THE PRESENT INVENTION

The present invention provides adhesive silicone compositions comprising:

(A) 100 parts by weight of a polyorganosiloxane containing at least one unit represented by the following general formula:

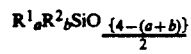

in which $R^1$ represents an alkenyl group; $R^2$ represents a substituted or unsubstituted monovalent hydrocarbon group containing no aliphatically unsaturated bond; a represents an integer of 1 to 3; b represents an integer of 0 to 2; and (a+b) represents an integer of 1 to 3;

(B) 0.1 to 20 parts by weight of a polyorganohydrogensiloxane containing a unit represented by the following general formula;

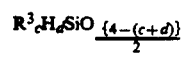

in which R³ represents a substituted or unsubstituted monovalent hydrocarbon group; c represents an integer of 0 to 2, d represents 1 or 2, and (c+d) represents an integer of 1 to 3, and containing at least 2 hydrogen atoms bonded to silicon atoms; the number of hydrogen atoms bonded to silicon atoms being 0.3 to 5.0, per alkenyl radical contained in the polyorganosiloxane of Component(A);

(C) at least two members selected from the group consisting of
  (a) 0.05 to 15 parts by weight of an organosilicon compound containing at least one (meth)-acryloxyalkyl group bonded to a silicon atom and at least two alkoxy groups bonded to silicon atoms;
  (b) 0.05 to 15 parts by weight of an organosilicon compound containing at least one epoxy ring-containing group bonded to a silicon atom and at least two alkoxy groups bonded to silicon atoms; and
  (c) 0.005 to 10 parts by weight of an isocyanurate compound represented by the following general formula:

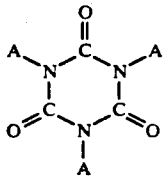

in which A represents a group selected from the group consisting of alkenyl groups, (meth)a-cryloxyalkyl groups, acetylenically unsaturated groups and —(CH₂)₃SiR⁴$_e$(OR⁵)$_{3-e}$ in which R⁴ is a substituted or unsubstituted monovalent hydrocarbon group; R⁵ is an alkyl group having not more than 4 carbon atoms; and e is an integer of 0 to 2, and (D) a catalytic amount of a compound selected from the group consisting of platinum compounds, palladium compounds and rhodium compounds.

The polyorganosiloxane of Component (A) contains at least one alkenyl group directly bonded to a silicon atom. The polyorganosiloxane may be either a straight chain or a branched chain, or a mixture thereof. Straight chain polyorganosiloxanes are preferable with regard to ease in synthesis and in the elasticity of resultant adhesive compositions. As examples of R¹ in the above-described general formula, mention may be made of vinyl, allyl, 1-butenyl, and the like. Among these groups, vinyl is preferred with regard to cost and ease of production. Examples of R² and other organic groups which are bonded to silicon atoms in the siloxane unit include preferably alkyl groups, such as methyl, ethyl and propyl; aryl groups, such as phenyl; chloromethyl groups; and 3,3,3-trifluoropropyl groups. Of these groups, methyl is particularly preferred with regard to cost and ease of production. In Component (A), the unit represented by the following general formula:

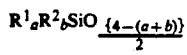

in which R¹, R², a and b have the same meanings as defined above, may be present either at the terminal or within the molecular chains of polyorganosiloxanes, or may be present at both of the positions. It is preferable, however, that the unit be present at the terminals, so that the compositions will have excellent mechanical properties after being cured. In cases where the compositions are to be used for potting, coating, adhesion, or the like, the viscosity of the compositions can be preferably from 10 to 500,000 centipoise, and most preferably 100 to 100,000 centipoise at 25° C.

Examples of polyorganosiloxanes suitable as component (A) include straight chain polyorganosiloxanes-represented by the following formula:

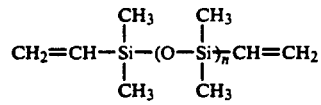

in which n represents a positive integer; partly branched polyorganosiloxanes; polyorganosiloxanes terminated with divinylmethylsilyl groups; and polymers consisting of (CH₃)₂(CH₂=CH)SiO$_{\frac{1}{2}}$ units, (CH₃)₃SiO$_{\frac{1}{2}}$ units and SiO₂ units which may be used, for example, to increase the mechanical strength of the rubber elastomers. The polyorganosiloxane can be used either individually or as a mixture of two or more.

The polyorganohydrogensiloxane of Component (B) undergoes addition reaction with the alkenyl groups contained in Component (A) in the presence of a catalyst described hereinbelow. Component B is therefore indispensable to render the composition of the present invention curable. Any known polyorganosiloxane can be used irrespective of its molecular structure, including those having a straight, cyclic and branched structure, provided that it has two or more Si-H bonds within one molecule. However, polyorganohydrogensiloxanes having a straight chain structure or polyorganosiloxanes consisting of R³₂HSiO$_{\frac{1}{2}}$ units and SiO₂ units are preferred due to ease in synthesis. Examples of R³ groups include alkyl groups, such as methyl and ethyl, and aryl groups, such as phenyl. Of these groups, methyl and/or phenyl is preferred with regard to heat-resistance. Methyl is particularly preferred with regard to cost and ease in production. Component (B) is used in such an amount that the number of hydrogen atoms bonded to silicon atoms is in the range of from 0.3 to 5.0, preferably from 0.5 to 3.0, per R¹, that is, alkenyl group, contained in Component (A). When the number of hydrogen atoms is less than 0.3, insufficient crosslinking will result, whereas when the number exceeds 5.0, undesirable foaming tends to occur during curing and the physical properties (in particular, heat-resistance) of the cured product tend to change to an undesirably greater extent.

Component (C) is an ingredient employed to impart excellent adhesion properties to the compositions according to the invention, wherein at least two members selected from (C) (1)–(3) are employed in combination.

Organosilicon compounds of Component (C)(1) contain within the molecule at least one (meth)acryloxyalkyl group bonded to a silicon atom and at least two alkoxy groups bonded to silicon atoms. As examples of (meth)acryloxyalkyl groups, mention may be made of acryloxypropyl, methacryloxypropyl, and the like. As examples of alkoxy groups, mention may be made of methoxy, ethoxy, propoxy, butoxy, and the like. As examples of other groups which can be bonded to silicon atoms, mention may be made of hydrogen, as well as those groups mentioned hereinabove in connection with $R^2$. Component (C)(1) is required to contain at least two, preferably three or more, alkoxy groups bonded to silicon atoms. If the number is less than two, good adhesion properties will not be attained. Examples of such compounds include the following silane compounds:

$$CH_2=\overset{H}{\underset{|}{C}}-\overset{O}{\underset{\|}{C}}-O-(CH_2)_3Si(OCH_3)_3$$

$$CH_2=\overset{H}{\underset{|}{C}}-\overset{O}{\underset{\|}{C}}-O-(CH_2)_3Si(OC_2H_5)_3$$

$$CH_2=\overset{H}{\underset{|}{C}}-\overset{O}{\underset{\|}{C}}-O-(CH_2)_3Si(OCH_3)_2\overset{CH_3}{\underset{|}{}}$$

$$CH_2=\overset{H_3C}{\underset{|}{C}}-\overset{O}{\underset{\|}{C}}-O-(CH_2)_3Si(OCH_3)_2\overset{CH_3}{\underset{|}{}}$$

and hydrolyzed condensation products thereof and the compound of the following formula:

$$CH_2=\overset{CH_3}{\underset{|}{C}}-\overset{}{\underset{\|}{C}}-O-(CH_2)_3\text{-}(\overset{CH_3}{\underset{|}{Si}}-O)_p Si(OCH_3)_3$$
$$\phantom{CH_2=C-}O\phantom{-O-(CH_2)_3-}CH_3$$

in which p represents a positive integer.

Component (C)(1) is incorporated in an amount of 0.05 to 15 parts by weight, preferably 0.1 to 10 parts by weight, per 100 parts by weight of Component (A). When the amount is less than 0.05 parts by weight, there will result poor durability of adhesiveness under high temperature conditions, except in cases where Components (C)(2) and (C)(3) are used in quantities specified hereinbelow. When the amount exceeds 15 parts by weight, rubber elastomers having significantly deteriorated physical properties will result.

Organosilicon compounds of Component (C)(2) contain within the molecule at least one epoxy ring-containing group bonded to a silicon atom and at least two alkoxy groups bonded to silicon atoms. As examples of epoxy ring-containing groups, mention may be made of epoxy, glycidoxy, 3,4-epoxycyclohexyl, and the like. As examples of alkoxy groups, mention may be made of methoxy, ethoxy, propoxy, butoxy, and the like. As examples of other groups which can be bonded to silicon atoms, mention may be made of hydrogen, as well as those groups mentioned hereinabove in connection with $R^2$. Compound (C)(2) is required to contain at least two, preferably three or more, alkoxy groups bonded to silicon atoms. If the number is less than two, good adhesion properties will not be attained. Examples of such compounds include the following silane compounds:

$$\underset{\diagdown O \diagup}{CH_2\text{—}CH}-CH_2-O-(CH_2)_3Si(OCH_3)_3$$

$$\underset{\diagdown O \diagup}{CH_2\text{—}CH}-CH_2-O-(CH_2)_3Si(OCH_3)_2\overset{CH_3}{\underset{|}{}}$$

-continued $$\underset{\diagdown CH_2\text{—}CH_2 \diagup}{\overset{O-CH-CH_2}{\underset{CH}{|\diagup}}\phantom{xx}\overset{}{\underset{}{HC}}-CH_2CH_2Si(OCH_3)_3}$$

and hydrolyzed condensation products thereof and the compound of the following formula:

| Component | Parts by Weight, Grams |
|---|---|
| Aziridine Acrylic from Example 3 | 115.2 |
| Polysiloxane solution[1] | 1.0 |
| U.V. Absorber[2] | 3.0 |
| Light Stabilizer[3] | 1.0 |
| Additive[4] | 0.6 |
| Toluene | 19.0 |
| Isobutyl Acetate | 38.4 |
| n-Amyl Propionate | 6.4 |
| Methyl—Amyl Ketone | 6.0 |
| Ethyl-3-Ethoxy Propionate | 16.8 |
| Oxo—Heptyl Ether Acetate | 42.3 |
| Anhydride Resin[5] | 53.3 |

[1] Dow Corning DC-200, 135 csk. dissolved in xylene to give 0.5 percent polysiloxane solution
[2] Tinuvin 323 available from Ciba-Geigy Corporation
[3] Tinuvin 292 available from Ciba-Geigy Corporation
[4] BYK-300 available from BYK-MALLINCKRODT
[5] Maleic Anhydride functional acrylic polymer in which p represents a positive integer.

Component (C)(2) is incorporated in an amount of 0.05 to 15 parts by weight, preferably 0.1 to 10 parts by weight, per 100 parts by weight of Component (A). When an amount of less than 0.05 parts by weight, will result in poor durability of adhesion under high temperature conditions, except in cases where Components (C)(2) and (C)(3) are used in quantities specified herein. An amount exceeding 15 parts by weight will result in rubber elastomers having significantly deteriorated physical properties.

Isocyanurates of Component (C)(3) are represented by the following general formula:

$$\begin{array}{c}O\\\|\\A\diagdown N\diagup\overset{C}{\underset{}{}}\diagdown N\diagup A\\|\phantom{xxx}|\\\overset{}{\underset{O=C}{}}\phantom{xx}\overset{}{\underset{C=O}{}}\\\diagdown N\diagup\\|\\A\end{array}$$

wherein A has the same meaning as defined hereinabove. As examples of alkenyl groups, mention may be made of vinyl, allyl, and the like. As examples of (meth-)acryloxyalkyl groups, mention may be made of acryloxypropyl, methacryloxypropyl, and the like. As examples of acetylenically unsaturated groups, mention may be made of —$CH_2$—C≡CH. As examples of —$(CH_2)_3SiR^4{}_e(OR^5)_{3-e}$ in which e, $R^4$ and $R^5$ are as defined above, mention may be made of $$-(CH_2)_3Si(OCH_3)_2\overset{CH_3}{\underset{|}{}},$$

and the like. Of these groups, allyl and trialkoxysilyl are preferred with regard to imparting adhesion properties. In particular, those in which all the A groups are allyl are most preferred with regard to availability of raw materials and the rapid development of the adhering function under moderate heating at around 100° C.

Component (C)(3) is incorporated in an amount of 0.005 to 10 parts by weight, preferably 0.05 to 5 parts by weight, per 100 parts by weight of Component (A). When the amount is less than 0.005 parts by weight, there will be poor durability of adhesion under high temperature conditions, except in cases where Components (C)(1) and (C)(2) are used in quantities specified hereinbefore. When the amount exceeds 10 parts by weight, rubber elastomers having significantly deteriorated physical properties will result.

In the present invention, at least two members selected from Components (C)(1), (C)(2) and (C)(3) must be used in quantities specified hereinabove. It is preferred to use Component (C)(1) together with Component (C)(2) since there can be formed cured rubber products which are highly heat resistant and hence exhibit less change in hardness with the lapse of time. It is most preferred to use all three component since the development of the adhering function can be accelerated even when heated at lower temperatures.

In the present invention, platinum, rhodium and palladium compounds of Component (D) are used as a catalyst for the addition reaction between Components (A) and (B), that is, as a catalyst for curing the compositions of the invention. As examples of compounds usable as Component (D), mention may be made of platinum compounds, such as chloroplatinic acid, chloroplatinic acids modified with alcohols, complexes of platinum with olefins, complexes of platinum with ketones, complexes of platinum with vinylsiloxanes, platinum supported on a carrier, such as alumina and silica, platinum black, etc.; palladium compounds, such as tetrakis(triphenylphosphine) palladium, mixtures of palladium black and triphenylphosphine, etc.: and rhodium compounds. Component (D) is used in an amount required as a catalyst which (reduced to the weight of platinum, palladium and/or rhodium) is within the range of 0.1 to 1,000 ppm, preferably from 0.5 to 200 ppm, based on the weight of Component (A). If an amount less than 0.1 ppm is used insufficient curing will result due to low catalyst concentration. On the other hand, it is economically disadvantageous to use Component (D) in excessively large quantities since it contains noble metals and is generally expensive. In addition, no further improvements may be obtained even if Component (D) is used in an amount greater than 1,000 ppm, and a deterioration in heat-resistance may occur.

Components (A) to (D) are usually packed in two separate packages: Components (A), (C) and (D), in one package, and Component (B) in the other; or Components (A) and (D) in one package, and Components (B) and (C) in the other. The four components contained in the two separate packages are mixed at the time of use. If desired, all four components can be packed in one package, provided that the components are incorporated with an additive which is capable of inhibiting addition reaction at lower temperatures. Examples of such inhibitors include: aminoalkylorganopolysiloxanes, α-alkynyl compound, and the like.

Where desired, the composition of the present invention may further contain fillers, pigments, agents for improving heat resistance, antifungal agents, and the like. As examples of such additives, mention may be made of fumed silica, precipitated silica, ground quarts, diatomaceous earth, titanium oxide, aluminum oxide, zinc oxide, iron oxide, cerium oxide, mica, clay, carbon black, graphite, calcium carbonate, zinc carbonate, manganese carbonate, cerium hydroxide, glass beads, metal powders, and the like. It is also possible to dilute the compositions by using solvents and/or other polyorganosiloxanes.

The composition of the present invention can be cured with relatively mild heating, the cured product exhibiting excellent adhesion not only to metals, but also to engineering plastics, such as polybutylene terephthalates and the like, not only under ordinary conditions, but also under high temperature and high humidity conditions. The composition is applicable to a broad range of materials, unlike prior addition reaction-type polyorganosiloxane compositions. In particular, the composition of this invention can be used with particular advantage as a coating agent and the like for electrical and electronic parts.

Examples of the invention are given hereinbelow. In the following examples, 'parts' are based on weight, and the measurement of viscosity was carried out at 25° C.

EXAMPLES 1 TO 4 AND COMPARATIVE EXAMPLES 1 TO 3

Polydimethylsiloxane (Component A-1) having a viscosity of 100,000 centipoise (cps) and terminated with dimethylvinylsilyl groups at both terminals thereof, vinyl group-containing polysiloxane (Component A-2) represented by the following average formula: $((CH_3)_3SiO_{\frac{1}{2}})_6(CH_3(CH_2=CH)SiO)(SiO_2)_8$, polymethylhydrogen-siloxane (Component B) having a viscosity of 50 cps, terminated with trimethylsilyl groups at both terminals thereof and consisting of 60% by mole of methylhydrogensiloxane units and 40% by mole of dimethylsiloxane units, 1% solution of chloroplatinic acid in isopropanol (Component D), γ-methacryloxypropyl-trimethoxysilane (Component C-1), γ-glycidoxypropyltrimethoxysilane (Component C-2), triallylisocyanurate (Component C-3) and pulverized silica having an average particle size of 10 μm were uniformly mixed in quantities shown in Table 1 and then subjected to defoaming under reduced pressure.

The thus obtained silicone rubber composition was sandwiched, to form a layer of 10 mm×25 mm×1 mm (thickness), between plates (80 mm×25 mm×1 mm (thickness)) of polybutylene terephthalate, epoxy resin, phenol resin or ABS resin. It was then heated at 120° C. for 60 minutes to cure the composition. The resulting sample was cooled to 25° C. It was then (a) allowed to stand under ordinary conditions (25° C.×50% RH), (b) heated at 150° C. for 50 hours, (c) heated at 120° C. in hot water at a pressure of 2 atm for 50 hours, or (d) heated at 120° C. in hot water at a pressure of 2 atm for 150 hours. Upon returning it to ordinary temperature (25° C.), the sample was tested for adhesion by shear adhesion test.

In another test, the above composition was shaped into a sheet having a thickness of 6 mm and then cured by heating it at 120° C. for 60 minutes. After being cooled to 25° C., the cured product was (a) allowed to stand under ordinary conditions(25° C.×50% RH), (b) heated at 120° C. for 150 hours, or (c) heated at 120° C. for 500 hours, and the change of its hardness was examined. Results obtained are shown in Table 1.

TABLE 1

| | Ingredients (parts) | | | | | | | | Adhesive Strength (kg f/cm²) Under Ordinary Conditions (25° C. × 50% RH) | | | |
|---|---|---|---|---|---|---|---|---|---|---|---|---|
| | Component (A) | | Component (B) | Component (C) | | | Component (D) | Pulverized Silica | PBT | Epoxy Resin | Phenol Resin | ABS[*4] Resin |
| | (A-1) | (A-2) | | (C-1) | (C-2) | (C-3) | | | | | | |
| Example 1 | 75 | 25 | 5 | 1.3 | 1.2 | — | 2 | 50 | 30 | 30 | 31 | 30 |
| Example 2 | 75 | 25 | 5 | 2.5 | — | 1.0 | 2 | 50 | 36 | 32 | 36 | 34 |
| Example 3 | 75 | 25 | 5 | — | 2.5 | 1.0 | 2 | 50 | 30 | 30 | 32 | 30 |
| Example 4 | 75 | 25 | 5 | 1.3 | 1.2 | 1.0 | 2 | 50 | 32 | 30 | 32 | 33 |
| Comparative Example 1 | 75 | 25 | 5 | 2.5 | — | — | 2 | 50 | 35 | 33 | 34 | 34 |
| Comparative Example 2 | 75 | 25 | 5 | — | 2.5 | — | 2 | 50 | 32 | 32 | 31 | 32 |
| Comparative Example 3 | 75 | 25 | 5 | — | — | 1.0 | 2 | 50 | 15[*2] | 12[*2] | 15[*2] | 13[*2] |

| | Adhesive Strength (kg f/cm²) | | | | | | | | | Hardness | | |
|---|---|---|---|---|---|---|---|---|---|---|---|---|
| | Heated at 150° C., 50 hrs | | | Heated at 120° C., 50 hrs (2 atm) | | | Heated at 120° C., 150 hrs (2 atm) | | | Under Ordinary Conditions (25° C. × 50% RH) | After Being Heated | |
| | PBT | Epoxy Resin | Phenol Resin | PBT | Epoxy Resin | Phenol Resin | PBT | Epoxy Resin | Phenol Resin | | 120° C., 150 hrs | 120° C., 500 hrs |
| Example 1 | 33 | 32 | 34 | 32 | 32 | 30 | 30 | 35 | 31 | 40 | 40 | 42 |
| Example 2 | 34 | 32 | 35 | 30 | 30 | 32 | 22 | 20 | 24 | 39 | 41 | 45 |
| Example 3 | 36 | 33 | 31 | 30 | 31 | 31 | 32 | 31 | 35 | 42 | 52 | 65 |
| Example 4 | 36 | 38 | 36 | 35 | 37 | 33 | 35 | 35 | 36 | 40 | 40 | 41 |
| Comparative Example 1 | 27 | 28 | 25 | 29 | 31 | 29 | 18[*1] | 18[*1] | 20 | 39 | 41 | 46 |
| Comparative Example 2 | 33 | 30 | 31 | 31 | 30 | 30 | 19[*1] | 24 | 24 | 40 | 54 | 66 |
| Comparative Example 3 | <1[*3] | <1[*3] | <1[*3] | <1[*3] | <1[*3] | <1[*3] | <1[*3] | <1[*3] | <1[*3] | 44 | 54 | 65 |

[Notes]
[*1] Cohesive failure rate = 80%
[*2] Cohesive failure rate = 20%
[*3] Cohesive failure rate = 0%
[*4] Due to deformation of ABS resin, the adhesive strength of the composition could be determined only under ordinary conditions (25° C. × 50% RH).

EXAMPLES 5 AND 6

The compositions according to Example 1 and 4 were sandwiched with PBT or nickel plates in the same manner as above. The silicone rubber compositions were cured by heating at 100° C. for 60 minutes. The samples were (a) allowed to stand under ordinary conditions, (b) heated at 150° C. for 50 hours, or (c) heated at 120° C. for 50 hours in hot water at a pressure of 2 atm after being cooled to ordinary temperature. The cured samples were subjected to the same shear adhesion test. Results obtained are shown in Table 2.

TABLE 2

| | Composition | Plate | Adhesive Strength (kg f/cm²) | | |
|---|---|---|---|---|---|
| | | | Under Ordinary Conditions (25° C. × 50% RH) | Heated at 150° C., 50 hrs | Heated at 150° C., 50 hrs (2 atm) |
| Example 5 | 1 | PBT | 22* | 27 | 18* |
| | | Nickel | 25 | 28 | 20 |
| Example 6 | 4 | PBT | 31 | 33 | 32 |
| | | Nickel | 32 | 34 | 32 |

[Note]
*Cohesive failure rate = 90%

It would be apparent from the above results that the compositions according to the present invention are capable of retaining excellent adhesion not only under ordinary conditions, but also under high temperature and high humidity conditions. The excellent adhesion function can be attained even when cured at relatively low temperatures in cases where all of the Components (C-1), (C-2) and (C-3) are used.

While the invention has been described in detail and with reference to specific embodiments thereof, it will be apparent to one skilled in the art that various changes and modifications can be made therein without departing from the spirit and scope thereof.

What is claimed is:

1. An adhesive silicone composition comprising:
   (A) 100 parts by weight of a polyorganosiloxane containing at least one unit represented by the following general formula:

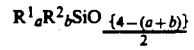

$$R^1_a R^2_b SiO_{\frac{\{4-(a+b)\}}{2}}$$

in which $R^1$ represents an alkenyl group; $R^2$ represents a substituted or unsubstituted monovalent hydrocarbon group containing no aliphatically unsaturated bond; a represents an integer of 1 to 3; b represents an integer selected of 0 to 2; and (a+b) represents an integer selected of 1 to 3, (B) 0.1 to 20 parts by weight of a polyorganohydrogensiloxane containing units represented by the following general formula:

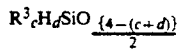

in which $R^3$ represents a substituted or unsubstituted monovalent hydrocarbon group; c represents an integer of 0 to 2; d represents an integer selected from 1 or 2; and (c+d) represents an integer of 1 to 3; and containing at least 2 hydrogen atoms bonded to silicon atoms; the number of hydrogen atoms bonded to silicon atoms being 0.3 to 5.0 per alkenyl radical contained in the polyorganosiloxane of Component (A), (C) at least two members selected from the group consisting of:

(C)(1) 0.05 to 15 parts by weight of an organosilicon compound containing at least one (meth)-acryloxyalkyl group bonded to a silicon atom and at least two alkoxy groups bonded to silicon atoms;

(C)(2) 0.05 to 15 parts by weight of an organosilicon compound containing at least one epoxy ring-containing group bonded to silicon atoms and at least two alkoxy groups bonded to silicon atoms; and (C)(3) 0.005 to 10 parts by weight of an isocyanurate compound represented by the following general formula:

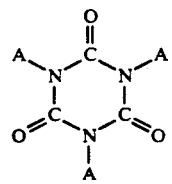

in which A represents a group selected from the group consisting of alkenyl groups; (meth)acryloxyalkyl groups; acetylenically unsaturated groups and $-(CH_2)_3SiR^4_e(OR^5)_{3-e}$ in which $R^4$ is a substituted or unsubstituted monovalent hydrocarbon group; $R^5$ is an alkyl group having not more than 4 carbon atoms; and e is an integer of 0 to 2, and (D) a catalytic amount of a compound selected from the group consisting of platinum compounds, palladium compounds and rhodium compounds.

2. A composition according to claim 1 wherein the polyorganosiloxane of Component (A) contains units of the following formula:

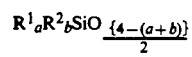

in which $R^1$, $R^2$, a and b are as defined in claim 1, at least at the terminals of its molecular chain.

3. A composition according to claim 1, wherein Components (A) and (B) are contained in such a ratio that the number of hydrogen atoms bonded to silicon atoms contained in Component (B) is from 0.5 to 3.0, per alkenyl group contained in Component (A).

4. A composition according to claim 1, wherein said (meth)acryloxyalkyl group contained in Component (C)(1) is acryloxypropyl or methacryloxypropyl.

5. A composition according to claim 1, wherein said epoxy ring-containing group contained in Component (C)(2) is glycidoxy or 3,4-epoxycyclohexyl.

6. A composition according to claim 1, wherein said group A contained in isocyanurate compounds of Component (C)(3) is allyl or trialkoxysilylpropyl.

* * * * *